United States Patent
Turpin et al.

(10) Patent No.: US 12,186,919 B2
(45) Date of Patent: Jan. 7, 2025

(54) PERCEPTION MAST FOR AN INTEGRATED MOBILE MANIPULATOR ROBOT

(71) Applicant: Boston Dynamics, Inc., Waltham, MA (US)

(72) Inventors: Matthew Turpin, Newton, MA (US); Benjamin Zelnick, Newton, MA (US); Michael Murphy, Carlisle, MA (US); Alex Perkins, Lincoln, MA (US)

(73) Assignee: Boston Dynamics, Inc., Waltham, MA (US)

( * ) Notice: Subject to any disclaimer, the term of this patent is extended or adjusted under 35 U.S.C. 154(b) by 312 days.

(21) Appl. No.: 17/699,545

(22) Filed: Mar. 21, 2022

(65) Prior Publication Data

US 2022/0305663 A1    Sep. 29, 2022

Related U.S. Application Data

(60) Provisional application No. 63/166,791, filed on Mar. 26, 2021.

(51) Int. Cl.
*B25J 9/16* (2006.01)
*B25J 5/00* (2006.01)
*B25J 13/08* (2006.01)

(52) U.S. Cl.
CPC ............ *B25J 9/1697* (2013.01); *B25J 5/007* (2013.01); *B25J 13/086* (2013.01)

(58) Field of Classification Search
CPC ........ B25J 9/1697; B25J 5/007; B25J 13/086; B25J 9/0027; B25J 9/162; B25J 19/021; B25J 19/023; B25J 19/06; B25J 13/08; B25J 13/006; B25J 19/02
See application file for complete search history.

(56) References Cited

U.S. PATENT DOCUMENTS

| | | |
|---|---|---|
| 4,789,295 A | 12/1988 | Boucher, Jr. et al. |
| 6,588,574 B2 | 7/2003 | Koini et al. |
| 7,153,085 B2 | 12/2006 | Clark et al. |

(Continued)

FOREIGN PATENT DOCUMENTS

| | | |
|---|---|---|
| CN | 112276966 A | 1/2019 |
| WO | 1998051598 A1 | 11/1998 |

(Continued)

OTHER PUBLICATIONS

International Search Report and Written Opinion mailed Jul. 8, 2022, in connection with International Application No. PCT/US2022/021146.

(Continued)

*Primary Examiner* — Kira Nguyen

(74) *Attorney, Agent, or Firm* — PIERCE ATWOOD LLP

(57) ABSTRACT

A perception mast for mobile robot is provided. The mobile robot comprises a mobile base, a turntable operatively coupled to the mobile base, the turntable configured to rotate about a first axis, an arm operatively coupled to a first location on the turntable, and the perception mast operatively coupled to a second location on the turntable, the perception mast configured to rotate about a second axis parallel to the first axis, wherein the perception mast includes disposed thereon, a first perception module and a second perception module arranged between the first imaging module and the turntable.

23 Claims, 9 Drawing Sheets

(56) References Cited

U.S. PATENT DOCUMENTS

| | | |
|---|---|---|
| 8,295,980 B2 | 10/2012 | Williamson |
| 8,965,563 B2 | 2/2015 | Eldershaw et al. |
| 9,004,846 B2 | 4/2015 | La Rovere et al. |
| 9,089,969 B1 | 7/2015 | Theobald |
| 9,102,053 B2 | 8/2015 | Suzuki |
| 9,233,470 B1 | 1/2016 | Bradski et al. |
| 9,434,558 B2 | 9/2016 | Criswell |
| 9,451,810 B2 | 9/2016 | Regan et al. |
| 9,481,530 B2 | 11/2016 | Brandmüller et al. |
| 9,487,361 B2 | 11/2016 | Girtman et al. |
| 9,493,316 B2 | 11/2016 | Girtman et al. |
| 9,503,704 B2 | 11/2016 | Ando |
| 9,519,882 B2 | 12/2016 | Galluzzo et al. |
| 9,604,363 B2 | 3/2017 | Ban |
| 9,688,489 B1 | 6/2017 | Zevenbergen et al. |
| 9,744,669 B2 | 8/2017 | Wicks et al. |
| 9,875,911 B2 | 1/2018 | Pagaila et al. |
| 9,919,872 B2 | 3/2018 | Khodl et al. |
| 9,940,604 B2 | 4/2018 | Galluzzo et al. |
| 9,969,573 B2 | 5/2018 | Girtman et al. |
| 9,987,746 B2 | 6/2018 | Bradski et al. |
| 10,005,627 B2 | 6/2018 | Girtman et al. |
| 10,071,856 B2 | 9/2018 | Hance et al. |
| 10,108,185 B1 | 10/2018 | Theobald |
| 10,122,995 B2 | 11/2018 | Rublee et al. |
| 10,124,489 B2 | 11/2018 | Chitta et al. |
| 10,124,967 B2 | 11/2018 | Girtman et al. |
| 10,147,069 B2 | 12/2018 | Galluzzo et al. |
| 10,216,865 B1 | 2/2019 | Theobald |
| 10,239,210 B2 | 3/2019 | Morency et al. |
| 10,343,857 B2 | 7/2019 | Morency et al. |
| 10,417,521 B2 | 9/2019 | Dong |
| 10,518,973 B2 | 12/2019 | Hance et al. |
| 10,661,444 B2 | 5/2020 | McCollum et al. |
| 10,766,149 B2 | 9/2020 | Marchese et al. |
| 10,793,047 B1 | 10/2020 | Theobald |
| 2006/0182607 A1 | 8/2006 | Clark et al. |
| 2013/0017053 A1 | 1/2013 | Forget et al. |
| 2013/0345874 A1* | 12/2013 | Blumberg .............. B25J 9/1676 901/47 |
| 2014/0079524 A1 | 3/2014 | Shimono et al. |
| 2015/0066199 A1 | 3/2015 | Shimono |
| 2016/0221187 A1 | 8/2016 | Bradski et al. |
| 2018/0111769 A1* | 4/2018 | Yuvaraj ................. B25J 9/1687 |
| 2018/0222695 A9 | 8/2018 | Girtman et al. |
| 2019/0246558 A1* | 8/2019 | Miller .................. A01G 25/165 |
| 2020/0114516 A1* | 4/2020 | Meyer .................... B25J 13/006 |
| 2020/0376656 A1* | 12/2020 | Berkowitz ............... B25J 5/007 |
| 2020/0376689 A1 | 12/2020 | Rembisz et al. |
| 2021/0221612 A1* | 7/2021 | Rogers ................. B65G 1/1373 |
| 2022/0234194 A1* | 7/2022 | Deyle .................... B25J 18/007 |

FOREIGN PATENT DOCUMENTS

| | | |
|---|---|---|
| WO | 2014041318 A1 | 3/2014 |
| WO | 2014111633 A1 | 7/2014 |
| WO | 2014113762 A1 | 7/2014 |
| WO | 2014186781 A1 | 11/2014 |
| WO | 2015017444 A1 | 2/2015 |
| WO | 2015035300 A1 | 3/2015 |
| WO | 2015187975 A1 | 12/2015 |
| WO | 2016014917 A1 | 1/2016 |
| WO | 2016033172 A1 | 3/2016 |
| WO | 2017146895 A1 | 8/2017 |
| WO | 2018022265 A1 | 2/2018 |
| WO | 20190218834 A1 | 11/2019 |
| WO | 2010034044 A2 | 4/2020 |

OTHER PUBLICATIONS

International Preliminary Report on Patentability for International Application No. PCT/US2022/021146 dated Sep. 12, 2023; 7 pages.

* cited by examiner

PERCEPTION MAST FOR AN INTEGRATED MOBILE MANIPULATOR ROBOT

CROSS-REFERENCE TO RELATED APPLICATIONS

This application claims priority under 35 U.S.C. § 119(e) to U.S. Provisional Application Ser. No. 63/166,791, filed Mar. 26, 2021, titled, "PERCEPTION MAST FOR AN INTEGRATED MOBILE MANIPULATOR ROBOT," which is incorporated by reference in its entirety herein.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction-based mechanisms), or some combination of a manipulator and a mobile robot. Robots are utilized in a variety of industries including, for example, manufacturing, warehouse logistics, transportation, hazardous environments, exploration, and healthcare.

SUMMARY

Some embodiments relate a mobile robot comprising a mobile base, a turntable operatively coupled to the mobile base, the turntable configured to rotate about a first axis, an arm operatively coupled to a first location on the turntable, and a perception mast operatively coupled to a second location on the turntable, the perception mast configured to rotate about a second axis parallel to the first axis, wherein the perception mast includes disposed thereon, a first perception module and a second perception module arranged between the first imaging module and the turntable.

In one aspect, the mobile robot further comprises control circuitry configured to control a rotation of the perception mast based, at least in part, on a rotation of the turntable and a distance between the first location and the second location. In another aspect, each of the first perception module and second perception module includes a two-dimensional (2D) color camera, a depth sensor and at least one light source. In another aspect, the depth sensor comprises a time-of-flight (TOF) camera. In another aspect, the depth sensor comprises a stereoscopic camera. In another aspect, the 2D camera comprises a red-green-blue (RGB) monocular camera. In another aspect, the first perception module and a second perception module are arranged along a same side of the perception mast. In another aspect, the first and second perception modules are arranged to maximize a distance between the first and second imaging modules along the same side of the perception mast. In another aspect, a field of view of the first perception module and a field of view of the second perception module do not overlap. In another aspect, the perception mast includes a plurality of sides including a first side as the same side on which the first and second perception modules are arranged, and the perception mast further includes disposed thereon, a third perception module arranged on a side of the perception mast other than the first side. In another aspect, the control circuitry is further configured to control an operation of the arm based, at least in part, on an output of the first perception module and/or the second perception module.

In one aspect, the second location is at an outer edge of the turntable. In another aspect, the mobile robot further comprises control circuitry configured to simultaneously control rotation of the perception mast and rotation of the turntable in opposite directions. In another aspect, the perception mast further includes disposed thereon, at least one antenna configured to receive signals from a system external to the mobile robot. In another aspect, the perception mast further includes a scanner configured to scan an identifier tag attached to an object in the environment of the mobile robot. In another aspect, the mobile robot further comprises control circuitry configured to control operation of the first perception module and the second perception module to capture one or more images as the mobile robot is in motion. In another aspect, the control circuitry is further configured to control an operation of the mobile robot based, at least in part, on the one or more images captured by the first perception module and/or the second perception module as the mobile robot is in motion. In another aspect, the operation of the mobile robot includes a direction of travel of the mobile robot. In another aspect, the mobile robot further comprises at least one camera disposed on the arm. In another aspect, the first perception module is oriented relative to the perception mast at a first angle and the second perception module is oriented relative to the perception mast at a second angle, and the first angle and the second angle are different.

Some embodiments relate to a method of capturing one or more images by a mobile robot. The method comprises controlling, during rotation of a turntable of the mobile robot in a first direction, a rotation of a perception mast in a second direction opposite the first direction, the perception mast being operatively coupled to the turntable, the perception mast having disposed thereon a plurality of perception modules, and capturing, by the plurality of perception modules, one or more images during rotation of the turntable and the perception mast.

In one aspect, capturing the one or more images comprises capturing the one or more images during movement of a mobile base to which the turntable is operatively coupled.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
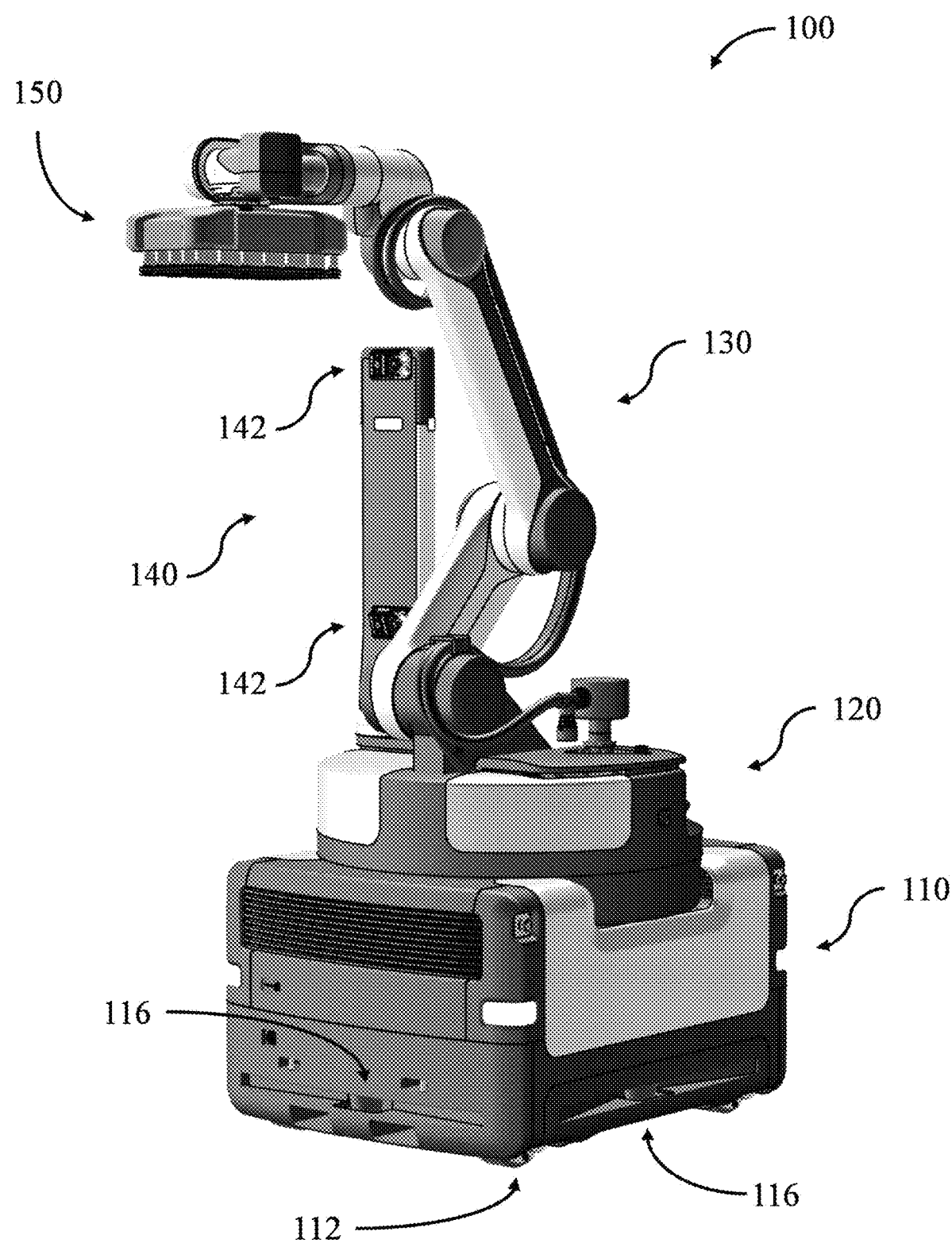
FIG. 1A is a perspective view of one embodiment of a robot.

Robots are typically configured to perform various tasks in an environment in which they are placed. Generally, these tasks include interacting with objects and/or the elements of the environment. Notably, robots are becoming popular in warehouse and logistics operations. Before the introduction of robots to such spaces, many operations were performed manually. For example, a person might manually unload boxes from a truck onto one end of a conveyor belt, and a second person at the opposite end of the conveyor belt might organize those boxes onto a pallet. The pallet may then be picked up by a forklift operated by a third person, who might drive to a storage area of the warehouse and drop the pallet for a fourth person to remove the individual boxes from the pallet and place them on shelves in the storage area. More recently, robotic solutions have been developed to automate many of these functions. Such robots may either be specialist robots (i.e., designed to perform a single task, or a small number of closely related tasks) or generalist robots (i.e., designed to perform a wide variety of tasks). To date, both specialist and generalist warehouse robots have been associated with significant limitations, as explained below.

A specialist robot may be designed to perform a single task, such as unloading boxes from a truck onto a conveyor belt. While such specialized robots may be efficient at performing their designated task, they may be unable to perform other, tangentially related tasks in any capacity. As such, either a person or a separate robot (e.g., another specialist robot designed for a different task) may be needed to perform the next task(s) in the sequence. As such, a warehouse may need to invest in multiple specialized robots to perform a sequence of tasks, or may need to rely on a hybrid operation in which there are frequent robot-to-human or human-to-robot handoffs of objects.

In contrast, a generalist robot may be designed to perform a wide variety of tasks, and may be able to take a box through a large portion of the box's life cycle from the truck to the shelf (e.g., unloading, palletizing, transporting, depalletizing, storing). While such generalist robots may perform a variety of tasks, they may be unable to perform individual tasks with high enough efficiency or accuracy to warrant introduction into a highly streamlined warehouse operation. For example, while mounting an off-the-shelf robotic manipulator onto an off-the-shelf mobile robot might yield a system that could, in theory, accomplish many warehouse tasks, such a loosely integrated system may be incapable of performing complex or dynamic motions that require coordination between the manipulator and the mobile base, resulting in a combined system that is inefficient and inflexible. Typical operation of such a system within a warehouse environment may include the mobile base and the manipulator operating sequentially and (partially or entirely) independently of each other. For example, the mobile base may first drive toward a stack of boxes with the manipulator powered down. Upon reaching the stack of boxes, the mobile base may come to a stop, and the manipulator may power up and begin manipulating the boxes as the base remains stationary. After the manipulation task is completed, the manipulator may again power down, and the mobile base may drive to another destination to perform the next task. As should be appreciated from the foregoing, the mobile base and the manipulator in such systems are effectively two separate robots that have been joined together; accordingly, a controller associated with the manipulator may not be configured to share information with, pass commands to, or receive commands from a separate controller associated with the mobile base. As such, such a poorly integrated mobile manipulator robot may be forced to operate both its manipulator and its base at suboptimal speeds or through suboptimal trajectories, as the two separate controllers struggle to work together. Additionally, while there are limitations that arise from a purely engineering perspective, there are additional limitations that must be imposed to comply with safety regulations. For instance, if a safety regulation requires that a mobile manipulator must be able to be completely shut down within a certain period of time when a human enters a region within a certain distance of the robot, a loosely integrated mobile manipulator robot may not be able to act sufficiently quickly to ensure that both the manipulator and the mobile base (individually and in aggregate) do not a pose a threat to the human. To ensure that such loosely integrated systems operate within required safety constraints, such systems are forced to operate at even slower speeds or to execute even more conservative trajectories than those limited speeds and trajectories as already imposed by the engineering problem. As such, the speed and efficiency of generalist robots performing tasks in warehouse environments to date have been limited.

In view of the above, the inventors have recognized and appreciated that a highly integrated mobile manipulator robot with system-level mechanical design and holistic control strategies between the manipulator and the mobile base may be associated with certain benefits in warehouse and/or logistics operations. Such an integrated mobile manipulator robot may be able to perform complex and/or dynamic motions that are unable to be achieved by conventional, loosely integrated mobile manipulator systems. As a result, this type of robot may be well suited to perform a variety of different tasks (e.g., within a warehouse environment) with speed, agility, and efficiency.

Example Robot Overview

In this section, an overview of some components of one embodiment of a highly integrated mobile manipulator robot configured to perform a variety of tasks is provided to explain the interactions and interdependencies of various subsystems of the robot. Each of the various subsystems, as well as control strategies for operating the subsystems, are described in further detail in the following sections.

Figure 1B:
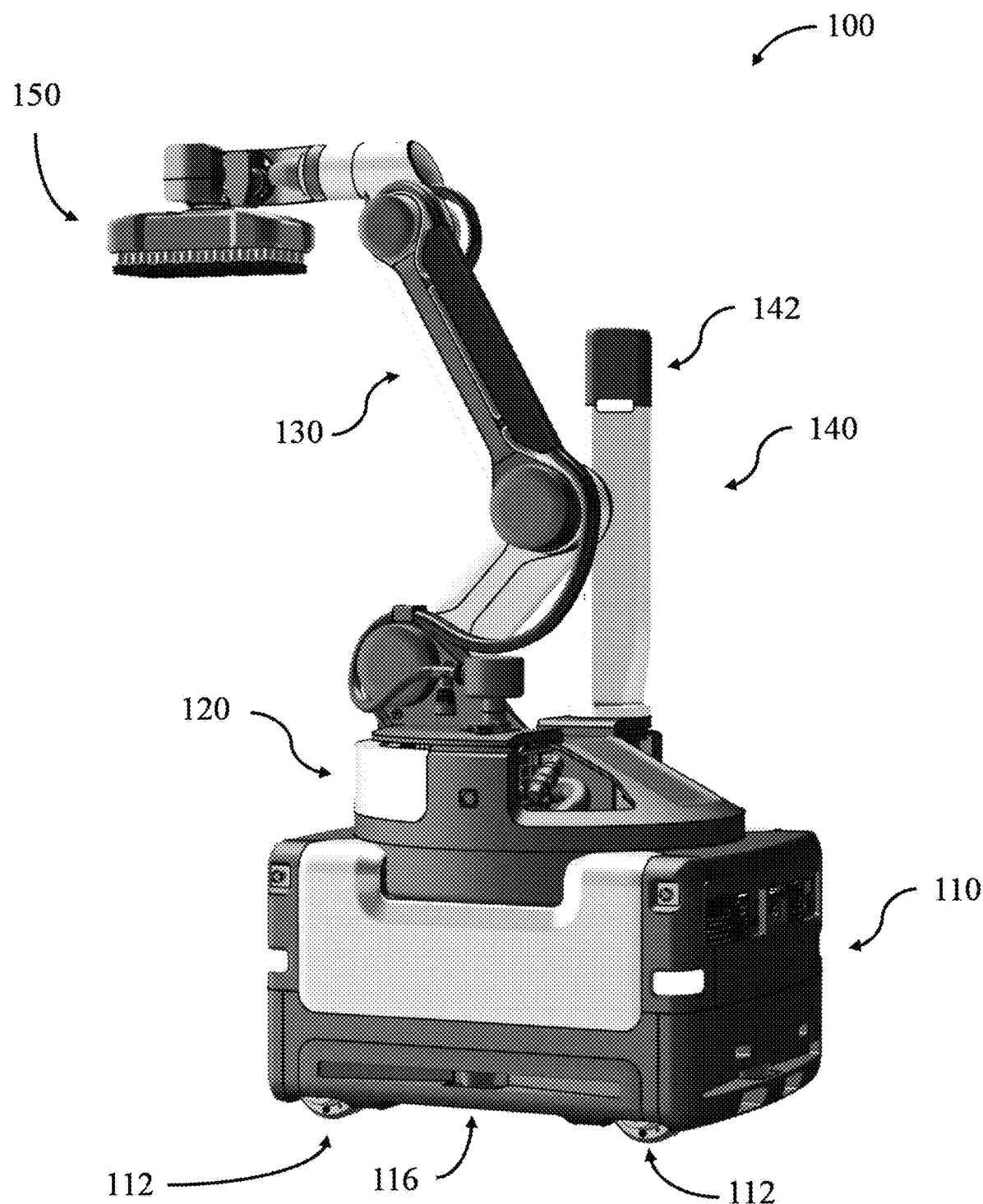
FIG. 1B is another perspective view of the robot of FIG. 1A.

FIGS. 1A and 1B are perspective views of one embodiment of a robot 100. The robot 100 includes a mobile base 110 and a robotic arm 130. The mobile base 110 includes an omnidirectional drive system that enables the mobile base to translate in any direction within a horizontal plane as well as rotate about a vertical axis perpendicular to the plane. Each wheel 112 of the mobile base 110 is independently steerable and independently drivable. The mobile base 110 additionally includes a number of distance sensors 116 that assist the robot 100 in safely moving about its environment. The robotic arm 130 is a 6 degree of freedom (6-DOF) robotic arm including three pitch joints and a 3-DOF wrist. An end effector 150 is disposed at the distal end of the robotic arm 130. The robotic arm 130 is operatively coupled to the mobile base 110 via a turntable 120, which is configured to rotate relative to the mobile base 110. In addition to the robotic arm 130, a perception mast 140 is also coupled to the turntable 120, such that rotation of the turntable 120 relative to the mobile base 110 rotates both the robotic arm 130 and the perception mast 140. The robotic arm 130 is kinematically constrained to avoid collision with the perception mast 140. The perception mast 140 is additionally configured to rotate relative to the turntable 120, and includes a number of perception modules 142 configured to gather information about one or more objects in the robot's environment. The integrated structure and system-level design of the robot 100 enable fast and efficient operation in a number of different applications, some of which are provided below as examples.

Figure 2A:
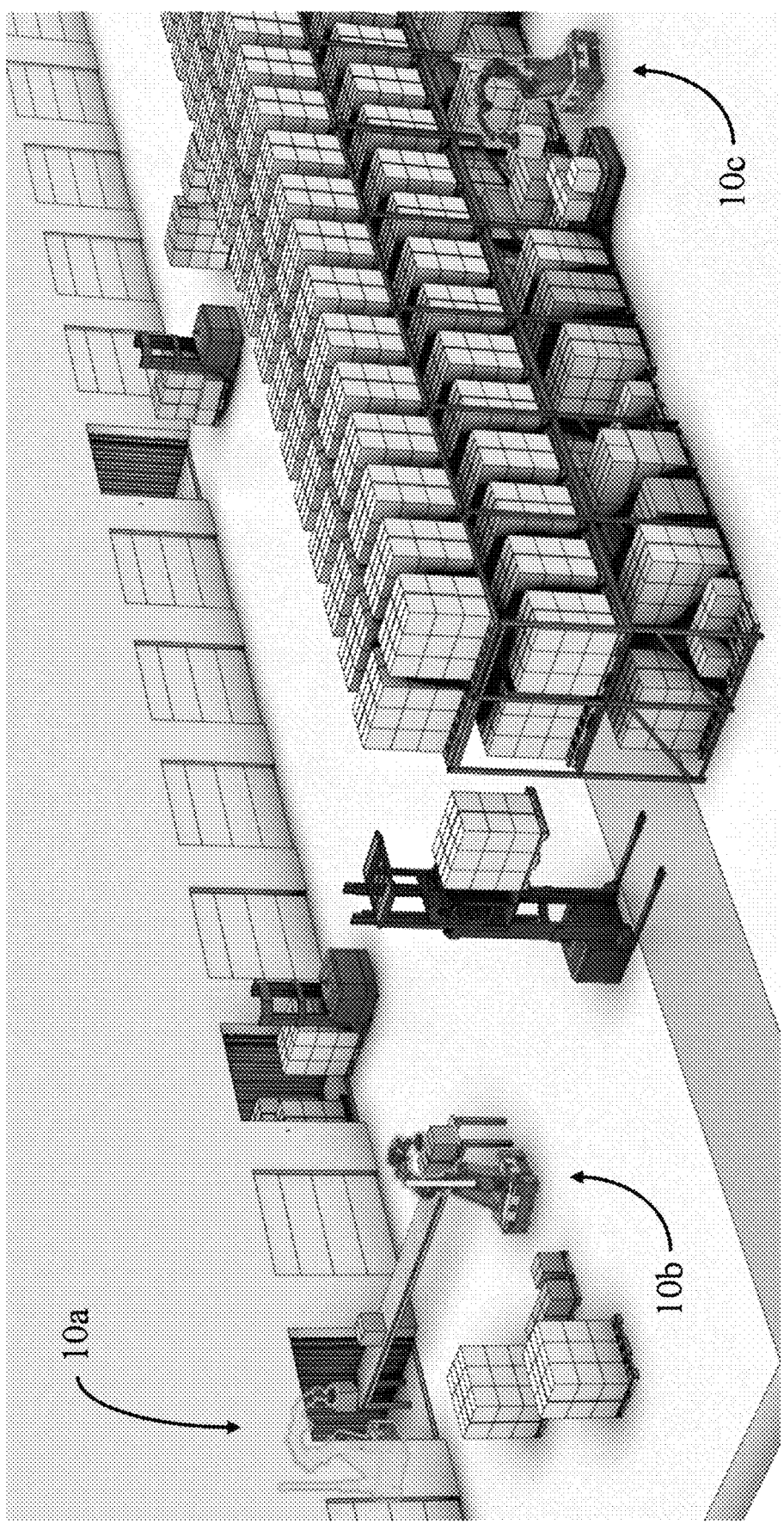
FIG. 2A depicts robots performing tasks in a warehouse environment.

FIG. 2A depicts robots 10a, 10b, and 10c performing different tasks within a warehouse environment. A first robot 10a is inside a truck (or a container), moving boxes 11 from a stack within the truck onto a conveyor belt 12 (this particular task will be discussed in greater detail below in reference to FIG. 2B). At the opposite end of the conveyor belt 12, a second robot 10b organizes the boxes 11 onto a pallet 13. In a separate area of the warehouse, a third robot 10c picks boxes from shelving to build an order on a pallet (this particular task will be discussed in greater detail below in reference to FIG. 2C). It should be appreciated that the robots 10a, 10b, and 10c are different instances of the same robot (or of highly similar robots). Accordingly, the robots described herein may be understood as specialized multi-purpose robots, in that they are designed to perform specific tasks accurately and efficiently, but are not limited to only one or a small number of specific tasks.

Figure 2B:
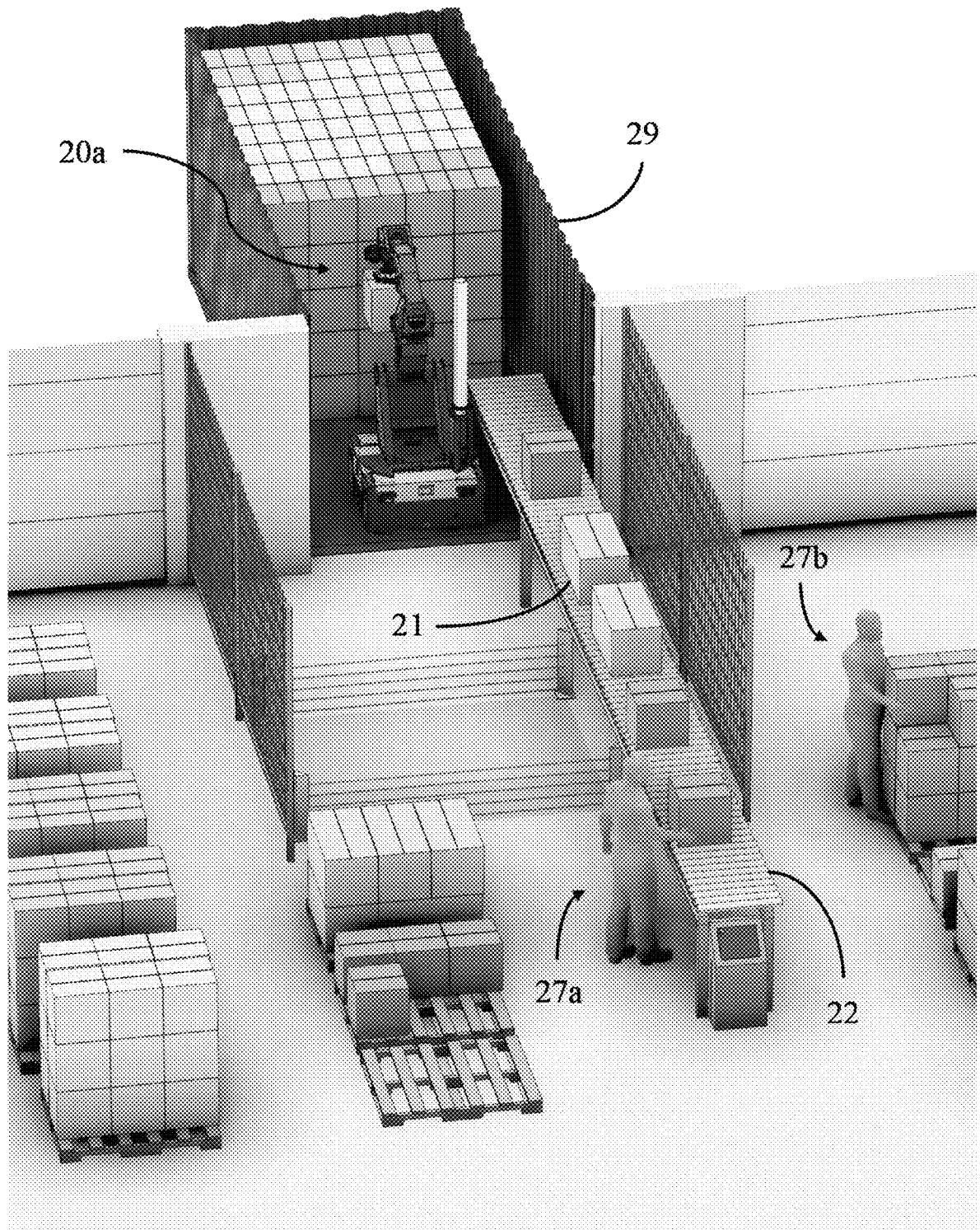
FIG. 2B depicts a robot unloading boxes from a truck.

FIG. 2B depicts a robot 20a unloading boxes 21 from a truck 29 and placing them on a conveyor belt 22. In this box picking application (as well as in other box picking applications), the robot 20a will repetitiously pick a box, rotate, place the box, and rotate back to pick the next box. Although robot 20a of FIG. 2B is a different embodiment from robot 100 of FIGS. 1A and 1B, referring to the components of robot 100 identified in FIGS. 1A and 1B will ease explanation of the operation of the robot 20a in FIG. 2B. During operation, the perception mast of robot 20a (analogous to the perception mast 140 of robot 100 of FIGS. 1A and 1B) may be configured to rotate independent of rotation of the turntable (analogous to the turntable 120) on which it is mounted to enable the perception modules (akin to perception modules 142) mounted on the perception mast to capture images of the environment that enable the robot 20a to plan its next movement while simultaneously executing a current movement. For example, while the robot 20a is picking a first box from the stack of boxes in the truck 29, the perception modules on the perception mast may point at and gather information about the location where the first box is to be placed (e.g., the conveyor belt 22). Then, after the turntable rotates and while the robot 20a is placing the first box on the conveyor belt, the perception mast may rotate (relative to the turntable) such that the perception modules on the perception mast point at the stack of boxes and gather information about the stack of boxes, which is used to determine the second box to be picked. As the turntable rotates back to allow the robot to pick the second box, the perception mast may gather updated information about the area surrounding the conveyor belt. In this way, the robot 20a may parallelize tasks which may otherwise have been performed sequentially, thus enabling faster and more efficient operation.

Also of note in FIG. 2B is that the robot 20a is working alongside humans (e.g., workers 27a and 27b). Given that the robot 20a is configured to perform many tasks that have traditionally been performed by humans, the robot 20a is designed to have a small footprint, both to enable access to areas designed to be accessed by humans, and to minimize the size of a safety zone around the robot into which humans are prevented from entering.

Figure 2C:
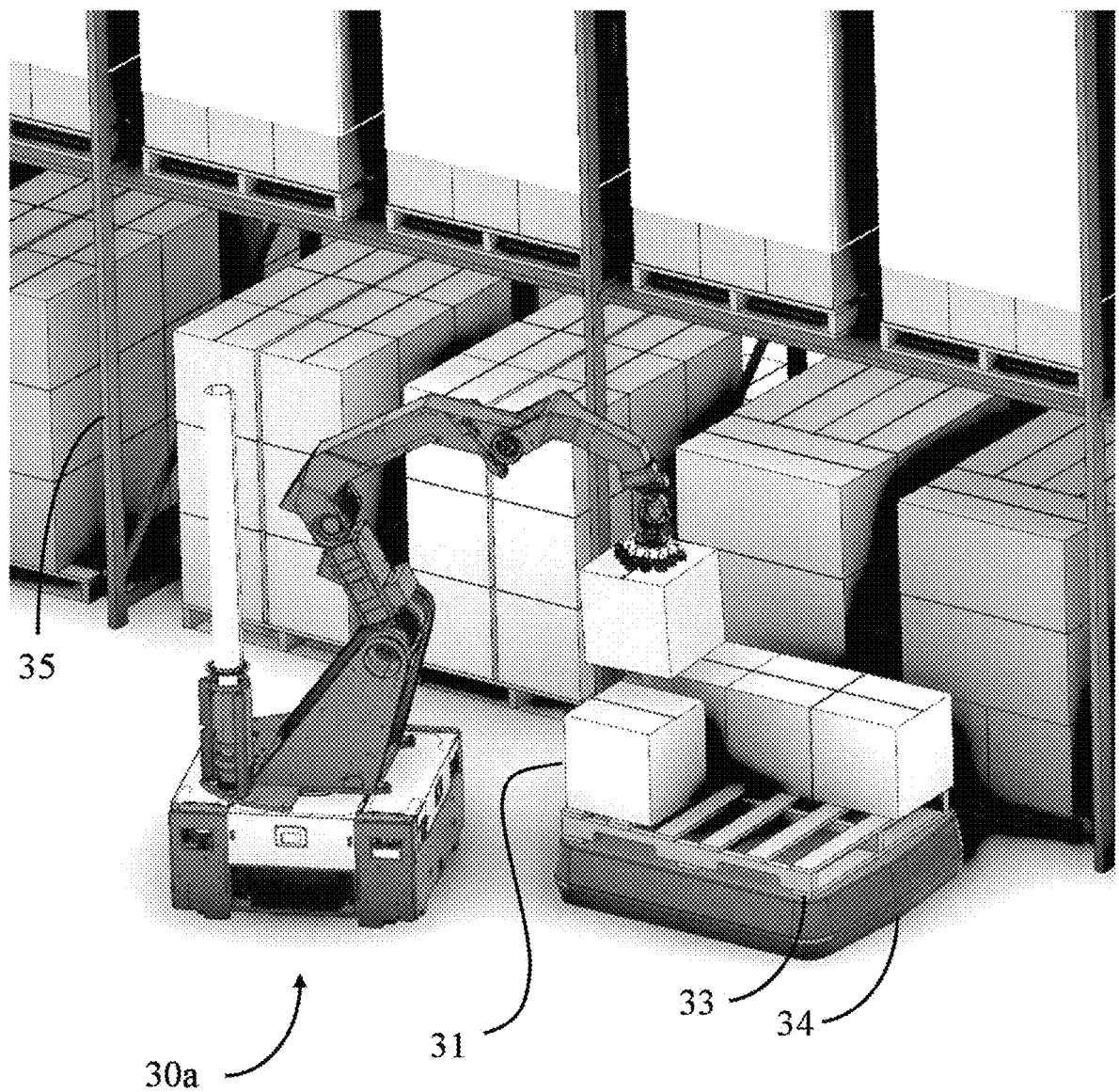
FIG. 2C depicts a robot building a pallet in a warehouse aisle.

FIG. 2C depicts a robot 30a performing an order building task, in which the robot 30a places boxes 31 onto a pallet 33. In FIG. 2C, the pallet 33 is disposed on top of an autonomous mobile robot (AMR) 34, but it should be appreciated that the capabilities of the robot 30a described in this example apply to building pallets not associated with an AMR. In this task, the robot 30a picks boxes 31 disposed above, below, or within shelving 35 of the warehouse and places the boxes on the pallet 33. Certain box positions and orientations relative to the shelving may suggest different box picking strategies. For example, a box located on a low shelf may simply be picked by the robot by grasping a top surface of the box with the end effector of the robotic arm (thereby executing a "top pick"). However, if the box to be picked is on top of a stack of boxes, and there is limited clearance between the top of the box and the bottom of a horizontal divider of the shelving, the robot may opt to pick the box by grasping a side surface (thereby executing a "face pick").

To pick some boxes within a constrained environment, the robot may need to carefully adjust the orientation of its arm to avoid contacting other boxes or the surrounding shelving. For example, in a typical "keyhole problem", the robot may only be able to access a target box by navigating its arm through a small space or confined area (akin to a keyhole) defined by other boxes or the surrounding shelving. In such scenarios, coordination between the mobile base and the arm of the robot may be beneficial. For instance, being able to translate the base in any direction allows the robot to position itself as close as possible to the shelving, effectively extending the length of its arm (compared to conventional robots without omnidirectional drive which may be unable to navigate arbitrarily close to the shelving). Additionally, being able to translate the base backwards allows the robot to withdraw its arm from the shelving after picking the box without having to adjust joint angles (or minimizing the degree to which joint angles are adjusted), thereby enabling a simple solution to many keyhole problems.

Of course, it should be appreciated that the tasks depicted in FIGS. 2A-2C are but a few examples of applications in which an integrated mobile manipulator robot may be used, and the present disclosure is not limited to robots configured to perform only these specific tasks. For example, the robots described herein may be suited to perform tasks including, but not limited to, removing objects from a truck or container, placing objects on a conveyor belt, removing objects from a conveyor belt, organizing objects into a stack, organizing objects on a pallet, placing objects on a shelf, organizing objects on a shelf, removing objects from a shelf, picking objects from the top (e.g., performing a "top pick"), picking objects from a side (e.g., performing a "face pick"), coordinating with other mobile manipulator robots, coordinating with other warehouse robots (e.g., coordinating with AMRs), coordinating with humans, and many other tasks.

Example Turntable and Perception Mast

As described above (e.g., in relation to FIGS. 1A and 1B), a robotic arm of an integrated mobile manipulator robot may be coupled to a mobile base through a turntable. The turntable may rotate the robotic arm relative to the mobile base about a vertical axis (e.g., a yaw axis). In some embodiments, a perception mast may additionally be coupled to the turntable, such that rotation of the turntable rotates (e.g., yaws) the robotic arm as well as the perception mast. In some embodiments, the perception mast may include an additional degree of freedom that allows the perception mast to rotate (e.g., yaw) relative to the turntable. As described above (e.g., in relation to FIG. 2B), such independent control of the perception mast relative to the turntable enables the robot to simultaneously manipulate an object in a first area with the robotic arm (e.g., by using the turntable to reposition the robotic arm as it grasps an object) while the perception mast gathers data about a second area of the environment (e.g., by using the additional actuator of the perception mast to point directional sensors of the perception mast toward the second area). Control of rotation of the perception mast independent of the turntable rotation also provides other advantages, discussed in more detail below. The coordination between the turntable, the perception mast, and other components of the robot is described below.

Referring to FIGS. 1A and 1B, the robot 100 includes a mobile base 110, a turntable 120, a robotic arm 130 (with an end effector 150) and a perception mast 140, as explained above. The perception mast 140 is implemented as a structural support coupled to a horizontal surface of the robot (e.g., the turntable 120) and includes a plurality of perception modules 142 arranged thereon. In box picking applications, in which the robot 100 repetitiously picks a box, rotates, places the box, and rotates back to pick the next box, the perception mast 140 may be configured to rotate independent of rotation of the turntable 120 on which it is mounted to enable cameras included in the perception modules 142 to capture images of the environment that enable the robot 100 to plan its next movement while simultaneously executing a current movement. For example, while the robot 100 is picking a first box, the perception modules 142 on the perception mast 140 may point at and gather information about the location where the first box is to be placed (e.g. a pallet, a conveyor belt). Then, while the robot 100 is placing the first box, the perception mast 140 may be rotated such that the perception modules 142 on the perception mast 140 point at the stack of boxes and gather information about the second box to be picked. In this way, the robot 100 may parallelize tasks which may otherwise have been performed sequentially, thus enabling faster and more efficient execution of tasks.

It should be appreciated that capturing images of the robot's environment includes not only capturing images about the task that the robot is performing (e.g., images of a stack of boxes or the area surrounding a pallet or conveyor), but also capturing images of the robot's environment that will ensure the robot is operating safely. For instance, when the robot is operating within a container (e.g., a truck) to unload boxes or other objects from the container. The perception modules 142 arranged on the perception mast 140 may be configured to image the walls and ceiling of the container to ensure that the robot components (e.g., mobile base and/or robotic arm) can operate safely and effectively within the container.

In the example described above, the perception mast is rotated away from where the robotic arm is operating to facilitate planning a next movement by the robotic arm while the robotic arm is performing a current movement (e.g., to enable movement planning one frame in advance). However, the inventors have recognized that capturing images of the robot arm itself may also be advantageous in certain scenarios. For instance, capturing images of the robotic arm while a calibration sequence is performed may be useful for calibrating the robotic arm and/or one or more of the components of the perception modules arranged on the perception mast. Additionally, capturing information about an object (e.g., a box) that the robotic arm has picked may be useful in determining one or more characteristics about the object that may help inform future actions by the robot. For instance, the dimensions of a box picked by the robotic arm may be useful in helping plan how to pick similarly-dimensioned boxes located in a stack of boxes being unloaded from a container, such as a truck. In some embodiments, the 2D camera may be configured to capture visual identifier (e.g., barcode, QR code) information located on an object (e.g. a box) that the robotic arm as picked. Such visual identifier information may be useful in identifying the contents of the box, a manufacturer associated with the contents of the box, and or any other information that may be useful to inform operation of the robot.

Figure 3A:
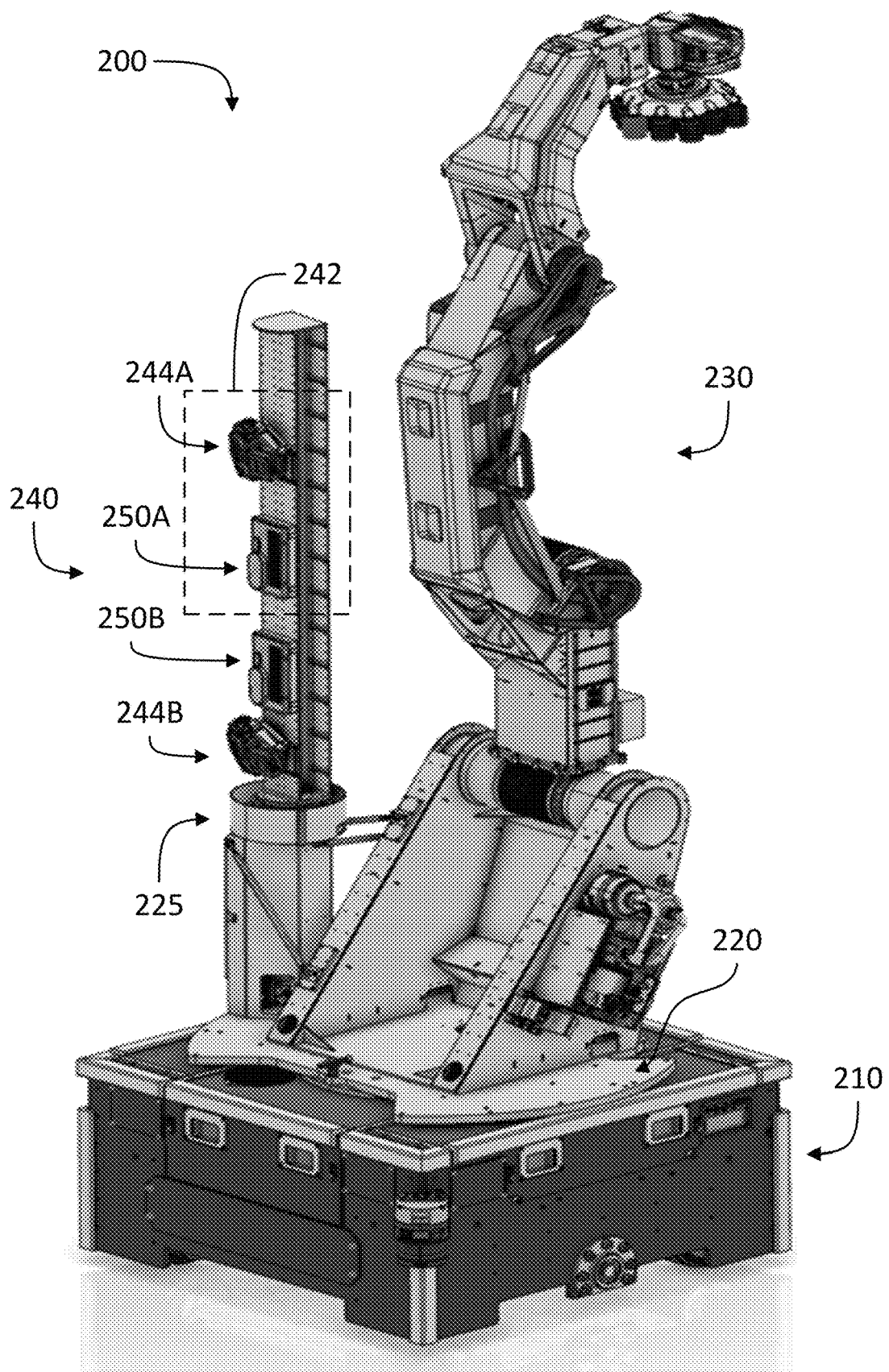
FIG. 3A is a perspective view of one embodiment of a robot.
Figure 3B:
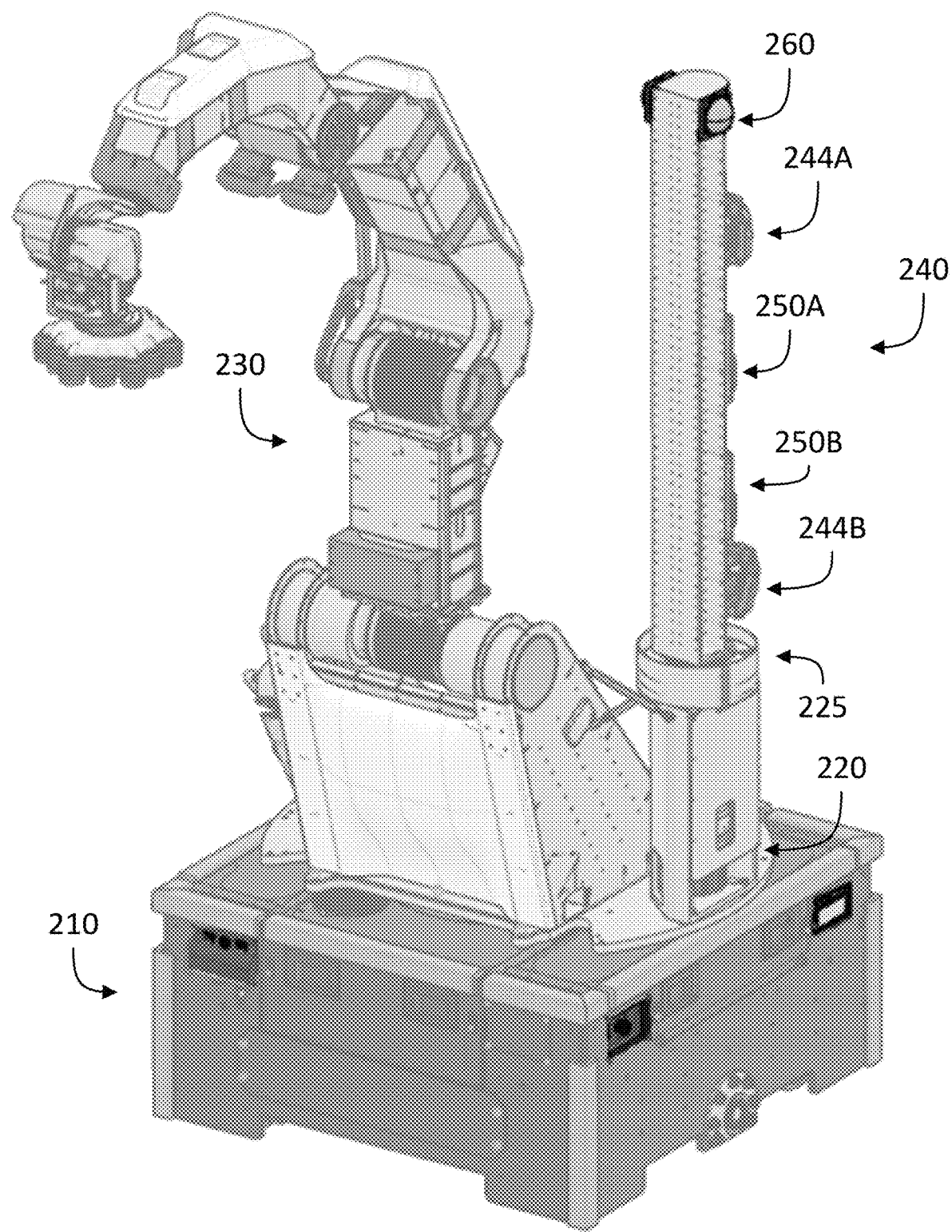
FIG. 3B is another perspective view of the robot of FIG. 3A.

FIGS. 3A and 3B are perspective views of a robot 200 designed in accordance with some embodiments. The robot 200 includes a mobile base 210 and a turntable 220 rotatably coupled to the mobile base. A robotic arm 230 is operatively coupled to the turntable 220, as is a perception mast 240. The perception mast 240 includes an actuator 225 configured to enable rotation of the perception mast 240 relative to the turntable 220 and/or the mobile base 210. In some embodiments, the perception mast 240 may include components not directly related to perception sensing of the robot's environment including, but not limited to, one or more communication systems and safety lights (e.g., light 260 shown in FIG. 3B). For instance, in some embodiments, the perception mast 240 includes a communications module arranged in a top portion of the perception mast. The communications module may include one or more antennas configured to receive signals from one or more systems external to the mobile robot (e.g. a building safety system, a warehouse management system). In some embodiments, the perception mast 240 further includes a scanner (e.g., a barcode reader, a QR code reader) configured to scan one or more visual identifiers (e.g., visual tags) in the environment.

As shown, the perception mast 240 includes a plurality of perception modules 242 arranged vertically along the perception mast. Each of the perception modules 242 includes a two-dimensional (2D) camera and a depth sensor. For instance, the upper perception module 242 includes upper 2D camera 244A and upper depth sensor 250A. The 2D camera and the depth sensor included in a perception module may be arranged in any suitable way. For instance, although upper depth sensor 250A is shown as being arranged below upper 2D camera 244A, it should be appreciated that the upper depth sensor 250A may alternatively be arranged above upper 2D camera 244A or co-located at the same height along perception mast 240 as 2D camera 244A. In some embodiments, one or more of the perception modules 242 may include only a 2D camera (e.g., an RGB camera or a monochrome camera) and no depth sensor or a 3D camera and no separate depth sensor, as aspects of the disclosure are not limited in this respect.

As shown, perception mast 240 also includes a lower perception module including lower 2D camera 244B and lower depth sensor 250A. The lower perception module is arranged along the same side of the perception mast 240 as the upper perception module and is located between the upper perception module 242 and the actuator 255. The inventors have recognized that having multiple perception modules located on the perception mast 240 at different locations (e.g., near the top and bottom of the perception mast) provides the robot 200 with imaging capabilities not possible when only a single perception module is included. For instance, the sensors within the upper perception module may have a different field of view that is non-overlapping (or partially overlapping) with the field of view of the sensors within the lower perception module such that the combined field of view of both perception modules is larger than each individual perception module's field of view. Such an expanded field of view may be useful to image a tall stack of boxes or other objects in the environment with which the robot is to interact. In some embodiments, the vertical distance between the plurality of perception modules along the perception mast is maximized to provide a wide vertical field of view. Additionally, images captured by the sensors of one of the perception modules may include characteristics of objects in the environment that are not well captured by the sensors of another of the perception modules. For instance, the sensors of the upper perception module may capture more detail about characteristics of objects in the environment located at a same or similar height as the upper perception module compared to sensors of the lower perception module, which may capture one or more characteristics of the same objects, but at more of an angle. As another example, the sensors of the lower perception module may capture more detail about objects located near the mobile base of the robot than the sensors of the upper perception module.

The inventors have recognized and appreciated that it may be advantageous to increase the height of the perception mast as much as possible, while still enabling the mobile robot to fit in most spaces where it is expected to operate (e.g., inside of a container such as a truck to unload boxes). Vertical height of at least one of the perception modules along the perception mast may be important for certain perception tasks, such as detecting surfaces of objects with which the robotic arm is going to interact. For instance, detection of box faces may be more accurate when the images captured by the perception modules are captured with low incident angle to the box faces. Additionally, having the perception modules spaced further apart facilitates detection of object characteristics that may be otherwise occluded or partially occluded by one of the perception modules. For instance, the lower perception module may have a field of view that enables the lower perception module to capture an image under a low shelf in a warehouse, whereas the area under the shelf may be at least partially occluded by a perception module located higher on the perception mast.

A perception module 242 used in accordance with some embodiments may include one or more light sources (e.g. flash-based light sources) configured to provide active illumination to the environment during image capture. Some embodiments include one or more visible light sources arranged proximate to the 2D camera to provide illumination of the environment during image capture by the 2D camera. Examples of a 2D camera that may be used in some embodiments include, but are not limited to, red-green-blue (RGB) cameras, monochrome cameras, prism cameras, or any other type of 2D camera configured to capture a 2D image of an environment.

The one or more light sources may be configured to provide active illumination to the environment during capture of an image by components of a perception module. The light source(s) may include any suitable light generation elements including, but not limited to, light emitting diodes (LEDs). In some embodiments, each perception module includes two visible light sources arranged to at least partially surround the 2D camera. Such an orientation may be advantageous to ensure that objects in the environment are illuminated uniformly and to minimize shadows during capture of images by the 2D camera. It should be appreciated however, that any suitable number of light sources arranged in any suitable way may be used, and the disclosure is not limited in this respect. In some embodiments, each of the cameras included in a perception module has at least one associated light source. For instance, a time-of-flight (TOF) camera used to capture depth information may have associated therewith one or more laser emitters to provide active illumination of the environment. In embodiments that use stereoscopic cameras for depth sensing, a texture projector may be included in a perception module to enable operation of the stereoscopic camera in low-light conditions.

The inventors have recognized that including one or more on-board light sources enables a mobile manipulation robot to capture images of the environment without the need to have a suitable level of ambient light present in the area within which the robot is operating. Providing on-board light sources also helps eliminate shadows that may exist in the environment. This is particularly important for tasks in which the robot is located within a container such as a truck in which there is not typically much ambient lighting.

As discussed above, a perception module may also include a depth sensor configured to capture depth information related to objects in the environment. Examples of depth sensors include, but are not limited to, stereoscopic cameras, time-of-flight (TOF) cameras, LiDAR, or any other depth sensors configured to capture depth information about the environment. In one embodiment, each perception module 242 includes two LED-based light sources, an RGB monocular camera and a time-of-flight (TOF) camera. As noted above, the arrangement of the particular components within a perception module is not limiting, and the components may be arranged in any suitable manner. Preferably the 2D camera and the depth sensor are arranged to provide a similar field of view, which facilitates registration of the information captured by the 2D camera and the depth sensor.

In some embodiments, each of the at least one light source, 2D camera and depth sensor within a perception module is electrically coupled to control circuitry configured to control a timing of operation of the individual components. For instance, the perception module may include hardware control circuitry electrically coupled to one or more of the components within the perception module to enable individual control of each component based on electrical signals provided by the control circuitry. In some embodiments, multiple of the components in the perception module may be electrically connected to each other such that triggering operation of one component automatically triggers operation of another component electrically connected to it without having to separately send a signal from the control circuitry to the another component to control its operation.

In some embodiments, the perception mast 240 may include control circuitry configured to control a timing of operation of sensors within each of multiple perception modules (e.g., the upper perception module and the lower perception module). Such centralized control circuitry may enable coordinated control across perception modules to facilitate capturing information from all of the sensors located therein simultaneously or near simultaneously. In other instances, the coordinated control across perception modules may help reduce cross-talk between the two perception modules. For instance, to detect distance information time-of-flight cameras typically emit pulses of infrared (IR) radiation and detect reflections of the emitted IR radiation from objects in the environment. Centralized control circuitry is used in some embodiments to stagger the timing of the IR radiation emitted for the two time-of-flight cameras arranged on the perception mast such that a respective time-of-flight sensor only senses reflections that correspond to its IR emitter and not from the IR emitter from the other time-of-flight sensor.

In some embodiments, one or both of the 2D camera and the depth sensor included within a perception module may have a fixed orientation (e.g., they may not actively pan and/or tilt). Additionally, the sensors within the upper and lower perception modules may be oriented at the same angle relative to the perception mast 240 or may be oriented at different angles relative to the perception mast to capture a desired field of view. For instance, the sensors of the upper perception module may be oriented to capture information about the environment at an angle of 90° relative to the vertical axis of the perception mast 240, whereas the sensors of the lower perception module may be oriented to capture information about the environment at an angle of 70° relative to the vertical axis of the perception mast 240 (i.e., facing downward toward the mobile base) to enable capture of information located near the mobile base. As shown, in some embodiments, the lower perception module may be arranged along the perception mast 240 at a location above actuator 255 that enables capture of information near the mobile base, but without including the mobile base itself (or including only limited portions of the mobile base) in the captured information.

The output of the plurality of perception modules may processed by one or more computing devices to determine characteristic(s) of one or more objects in the environment. The control circuitry located on the robot may be configured to perform an action (e.g., control an operation of the robotic arm, change a path direction of the mobile base) based, at least in part, on the one or more determined characteristics. For instance, the output of the perception modules may be used to determine faces for boxes arranged in a stack and based on the determined box faces it may be determined which box to pick from the stack next. In response to determining which box to pick next, the control circuitry may control the robotic arm to pick the next box.

In the embodiment shown in FIGS. 3A and 3B, the perception mast 240 includes two perception modules located on a same side of the perception mast. In some embodiments, the perception mast 240 includes one or more additional perception modules located on a different (e.g., opposite) side of the perception mast. Arranging at least two perception modules on different sides of the perception mast enables the robot to capture images in multiple directions simultaneously, which may be advantageous for performing some tasks.

Figure 4:
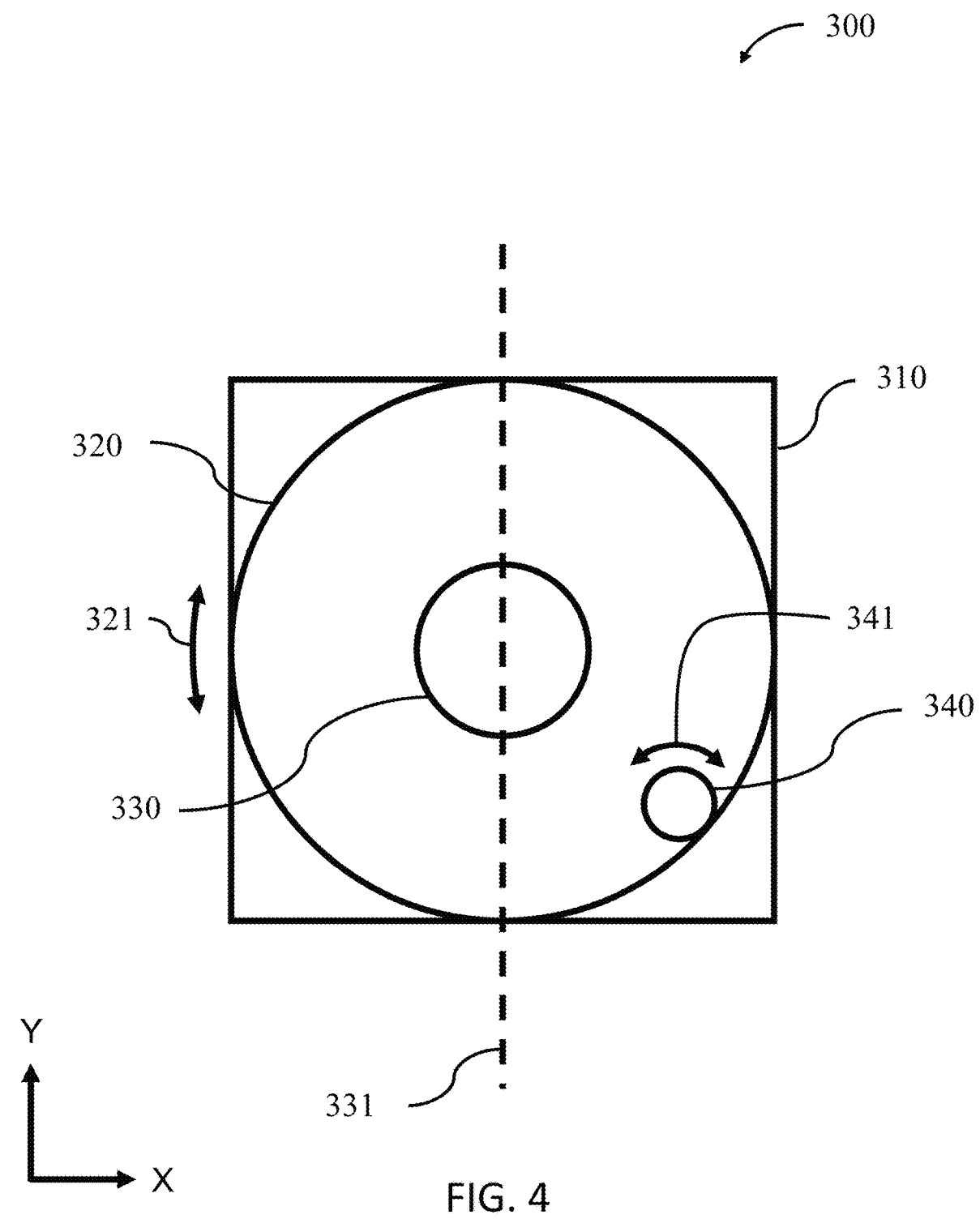
FIG. 4 is a top schematic view of one embodiment of a turntable of a robot.

FIG. 4 is a top schematic view of a robot 300. This abstracted view shows the relationships between motion of the turntable 320, the perception mast 340, and the robotic arm 330. The turntable 320 is configured to rotate relative to the mobile base 310 about a first vertical axis (which, in the top view of FIG. 4, is an axis into the page, which may be parallel to a Z axis that is perpendicular to the X and Y axes depicted in FIG. 4). The rotation of the turntable 320 relative to the mobile base 310 is indicated in the figure by arrow 321. The perception mast 340 is configured to rotate relative to the turntable 320 about a second vertical axis (which, again, in the top view of FIG. 4, is an axis into the page, and which may be parallel to the Z axis). The rotation of the perception mast 340 relative to the turntable 320 is indicated in the figure by arrow 341. It should be appreciated that, with both the first and second axes being vertical, the first and second axes are parallel.

The robotic arm 330 (of which only the footprint on the turntable 320 is shown in FIG. 4 for clarity) is coupled to the turntable 320 such that a base of the robotic arm 330 does not yaw (e.g., does rotate about an axis parallel to the Z axis) relative to the turntable 320. Importantly, the robotic arm 330 is kinematically constrained such that a portion of the robotic arm 330 is constrained to move within a vertical plane 331, defined within a coordinate system of the turntable 320. Briefly turning to FIG. 5, which presents a robotic arm 430 that is largely analogous to the arm 330 of FIG. 4, the portion of the robotic arm 430 proximal to the wrist 438 includes only pitch joints (i.e., joints 432, 434, and 436). That is, the proximal portion of the arm 430 is only able to rotate about parallel horizontal axes (i.e., axes 432a, 434a, and 436a in FIG. 5) relative to the turntable 420. As such, the proximal portion of the arm 430 is only able to move within a vertical plane defined within the coordinate system of the turntable 420. Returning to FIG. 4, a proximal portion of the robotic arm 330 is only able to move within the vertical plane 331. Given that a base of the arm 330 is rigidly mounted to the turntable 320, and therefore rotates about a vertical axis (as indicated by arrow 321) with the turntable 320, the plane 331 in which the proximal portion of the arm 330 moves also rotates with the turntable 320.

Importantly, the perception mast 340 is mounted to the turntable 320 at a location spaced from plane 331, such that the arm 330 is physically unable to collide with the perception mast 340. Stated differently, because both the robotic arm 330 and the perception mast 340 are mounted to the turntable 320, the turntable collocates the arm and the mast, thereby defining their relative positions. Because the perception mast 340 only rotates about a vertical yaw axis, and because the proximal portion of the robotic arm 330 is constrained to operate within a defined vertical plane, neither the robotic arm nor the perception mast is capable of horizontal movement (in the coordinate system of the turntable) to a degree that would result in collision of the arm 330 and the mast 340.

In embodiments of a robotic arm that include a 3-DOF wrist or that generally include joints other than pitch joints, portions of the robotic arm may not be constrained to remain within a vertical plane as described above. However, certain relevant geometries (e.g., link lengths, end effector sizes, perception mast location) may be selected such that collisions between the robotic arm and the perception mast are nonetheless avoided.

As discussed above, the location of the perception mast on the turntable is based at least in part on the geometry, orientation, and motion of the robotic limb, so as to prevent collisions between the arm and the mast. However, other considerations are also relevant to selection of a location of the perception mast on the turntable. From a sensing perspective, it may be desirable to locate the perception mast at a maximal distance from the robotic arm to limit occlusions of the sensors on the perception mast by the arm. From a safety perspective, it may be desirable to locate the perception mast within a footprint of the mobile base to avoid collisions between the perception mast and the environment. Accordingly, in some embodiments, the perception mast may be located on the turntable at a maximum radial extent of the turntable relative to the axis of rotation of the turntable. For example, if the turntable is circular and the perception mast is circular, the perception mast may be located at a position within the footprint of the turntable such that the circumferences of the perception mast and the turntable are internally tangent.

In addition to a perception mast and/or a robotic arm, other hardware may be mounted to a turntable of a robot. In embodiments of a robot in which an end effector of a robotic arm is a vacuum-based end effector (e.g., a vacuum gripper or suction gripper), the robot may include an on-board vacuum source that is coupled to and supplies vacuum to the end effector. In some such embodiments, the vacuum source may be coupled to a turntable such that the vacuum source rotates with the turntable when the turntable rotates relative to the mobile base. While it may be advantageous (from a stability perspective) to locate a heavy component such as a vacuum source close to the base of the robot, configuring the vacuum source to rotate with the turntable may be associated with certain benefits relating to routing and management of vacuum tubing.

As discussed previously in reference to FIG. 2B, the turntable, robotic arm, and perception mast of a robot (e.g., robot 20a) may all be controlled in a highly coordinated fashion by control circuitry of the robot. The inventors have recognized and appreciated that an advantage of having control over the rotation of the perception mast independent from the rotation of the turntable or motion of the mobile base is that the perception modules of the perception mast may be able to capture stable images even when the turntable and/or the mobile base of the robot is moving. For instance, as the turntable is rotating in a first direction (e.g., counterclockwise), the perception mast may be controlled to rotate in a second direction (e.g., clockwise) opposite the first direction. By counter-rotating the perception mast, images captured by the perception modules of the perception mast may have little to no blur due to motion of the components of the robot. The ability of the mobile manipulator robot to capture stabilized crisp images while the robot is moving enables faster cycle times to perform certain tasks because no part of the robot has to come to a full stop for any sustained period time. Rather, images of the environment can be captured "on-the-fly" as the robotic arm is simultaneously operating. The control circuitry may be configured to control the speed of rotation of the perception mast based, at least in part, on a speed of rotation of the turntable and a location of the perception mast on the turntable. In some embodiments, the speed of rotation of the perception mast may further be determined based on a location of the robotic arm on the turntable and/or the speed at which the mobile base is traveling.

As mentioned above, an advantage of having the perception mast able to be controlled independently of the turntable and the mobile base is the ability of the robot to capture images while the robot is moving. In the example above of box-picking, the motion of the robot was embodied in the robotic arm repeatedly picking boxes from a stack and placing them on a conveyor belt. However, controlling the perception mast to capture images in different directions as the mobile base is moving about a building such as a warehouse may also be beneficial, as the robot does not need to stop to capture images, but can capture stabilized images as the robot is moving. For instance, as the robot is driving down an aisle of a warehouse, the perception modules may be oriented at the shelves in the aisle to detect one or more tags placed thereon, which include information to facilitate performance of a task being performed by the robot. Images captured by the perception modules may also be used to facilitate safe operation of the robot as the robot is driving. For instance, the perception modules may be oriented to detect obstructions in the path of the robot and in response to the detection of an obstruction, the path of the robot may be changed to avoid the obstruction. Due to the perception mast being independently controllable from the turntable, the turntable itself, with the robotic arm operatively coupled thereto, can remain stationary while the robot is driving which improves safety, while the perception mast can be rotated to capture images in any desired direction for any desired purpose (or for multiple purposes, such as reading tags and obstacle avoidance).

In the examples provided above, perception modules were only described as being provided on the perception mast. However, in some embodiments, additional cameras or sensors may be arranged on other parts of the mobile manipulator robot (e.g., on the mobile base or the arm) to improve perception for performing certain tasks, and the disclosure is not limited in this respect.

Control of one or more of the robotic arm, the mobile base, the turntable, and the perception mast may be accomplished using one or more computing devices located on-board the mobile manipulator robot. For instance, one or more computing devices may be located within a portion of the mobile base with connections extending between the one or more computing devices and components of the robot that provide sensing capabilities and components of the robot to be controlled. In some embodiments, the one or more computing devices may be coupled to dedicated hardware configured to send control signals to particular components of the robot to effectuate operation of the various robot systems. In some embodiments, the mobile manipulator robot may include a dedicated safety-rated computing device configured to integrate with safety systems that ensure safe operation of the robot.

Figure 5:
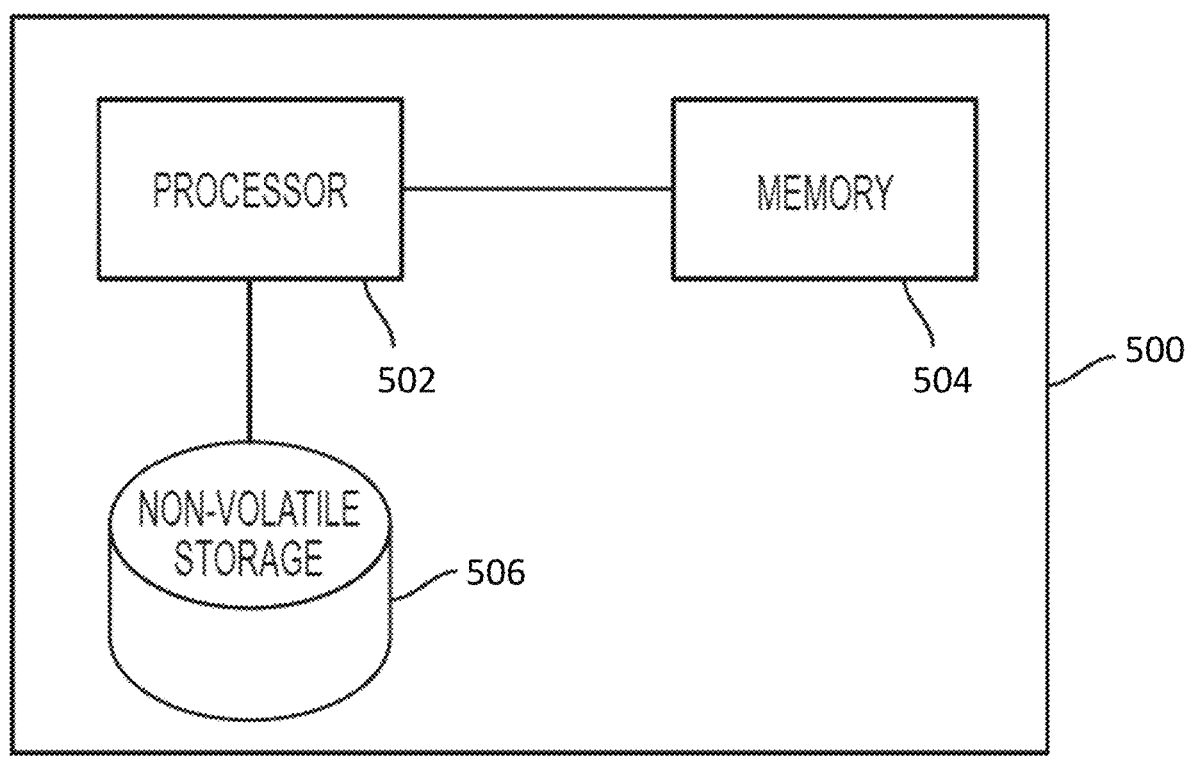
FIG. 5 is an example of a computer system that may be used to implement some embodiments.

An illustrative implementation of a computing system that may be used in connection with any of the embodiments of the disclosure provided herein is shown in FIG. 5. For example, any of the computing devices described above may be implemented as computing system 500. The computer system 500 may include one or more computer hardware processors 502 and one or more articles of manufacture that comprise non-transitory computer-readable storage media (e.g., memory 504 and one or more non-volatile storage devices 506). The processor 502(s) may control writing data to and reading data from the memory 504 and the non-volatile storage device(s) 506 in any suitable manner. To perform any of the functionality described herein, the processor(s) 502 may execute one or more processor-executable instructions stored in one or more non-transitory computer-readable storage media (e.g., the memory 504), which may serve as non-transitory computer-readable storage media storing processor-executable instructions for execution by the processor(s) 502.

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the terms "physical processor" or "computer processor" generally refer to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of a robot may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the robot and/or driving a wheel or arm of the robot. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

The invention claimed is:

1. A mobile robot comprising:
   a mobile base;
   a turntable operatively coupled to the mobile base, the turntable configured to rotate about a first axis;
   an arm operatively coupled to a first location on the turntable; and
   a perception mast operatively coupled to a second location on the turntable, the perception mast configured to rotate about a second axis parallel to the first axis, wherein the first axis is spatially separate from the second axis, and the perception mast includes, disposed thereon, a first perception module and a second perception module arranged between the first perception module and the turntable.

2. The mobile robot of claim 1, further comprising:
   control circuitry configured to control a rotation of the perception mast based, at least in part, on a rotation of the turntable and a distance between the first location and the second location.

3. The mobile robot of claim 2, wherein the control circuitry is further configured to control an operation of the arm based, at least in part, on an output of the first perception module and/or the second perception module.

4. The mobile robot of claim 1, wherein each of the first perception module and second perception module includes a two-dimensional (2D) camera, a depth sensor and at least one light source.

5. The mobile robot of claim 4, wherein the depth sensor comprises a time-of-flight (TOF) camera.

6. The mobile robot of claim 4, wherein the depth sensor comprises a stereoscopic camera.

7. The mobile robot of claim 4, wherein the 2D camera comprises a red-green-blue (RGB) monocular camera.

8. The mobile robot of claim 1, wherein the first perception module and the second perception module are arranged along a same side of the perception mast.

9. The mobile robot of claim 8, wherein the first and second perception modules are arranged to maximize a distance between the first and second perception modules along the same side of the perception mast.

10. The mobile robot of claim 8, wherein a field of view of the first perception module and a field of view of the second perception module do not overlap.

11. The mobile robot of claim 8, wherein the perception mast includes a plurality of sides including a first side as the same side on which the first and second perception modules are arranged, and wherein the perception mast further includes disposed thereon, a third perception module arranged on a side of the perception mast other than the first side.

12. The mobile robot of claim 1, wherein the second location is at an outer edge of the turntable.

13. The mobile robot of claim 1, further comprising:
control circuitry configured to simultaneously control rotation of the perception mast and rotation of the turntable in opposite directions.

14. The mobile robot of claim 1, wherein the perception mast further includes disposed thereon, at least one antenna configured to receive signals from a system external to the mobile robot.

15. The mobile robot of claim 1, wherein the perception mast further includes a scanner configured to scan an identifier tag attached to an object in an environment of the mobile robot.

16. The mobile robot of claim 1, further comprising:
control circuitry configured to control operation of the first perception module and the second perception module to capture one or more images as the mobile robot is in motion.

17. The mobile robot of claim 16, wherein the control circuitry is further configured to control an operation of the mobile robot based, at least in part, on the one or more images captured by the first perception module and/or the second perception module as the mobile robot is in motion.

18. The mobile robot of claim 17, wherein the operation of the mobile robot includes a direction of travel of the mobile robot.

19. The mobile robot of claim 1, further comprising at least one camera disposed on the arm.

20. The mobile robot of claim 1, wherein the first perception module is oriented relative to the perception mast at a first angle and the second perception module is oriented relative to the perception mast at a second angle, wherein the first angle and the second angle are different.

21. The mobile robot of claim 1, further comprising:
control circuitry configured to control a rotation of the perception mast independent of controlling a rotation of the turntable.

22. A method of capturing one or more images by a mobile robot, the method comprising:
controlling, during rotation of a turntable of the mobile robot in a first direction, a rotation of a perception mast in a second direction opposite the first direction, the perception mast being operatively coupled to the turntable, the perception mast having disposed thereon a plurality of perception modules; and
capturing, by the plurality of perception modules, one or more images during rotation of the turntable and the perception mast.

23. The method of claim 22, wherein capturing the one or more images comprises capturing the one or more images during movement of a mobile base to which the turntable is operatively coupled.

* * * * *